United States Patent
Bennett

(10) Patent No.: US 10,534,109 B2
(45) Date of Patent: *Jan. 14, 2020

(54) SYSTEM AND METHOD FOR QUANTIFYING STIMULATED ROCK QUALITY IN A WELLBORE

(71) Applicant: Petrohawk Properties, LP, Houston, TX (US)

(72) Inventor: Damon Bennett, Jenks, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 15/438,475

(22) Filed: Feb. 21, 2017

(65) Prior Publication Data

US 2017/0160430 A1    Jun. 8, 2017

Related U.S. Application Data

(63) Continuation of application No. 13/204,438, filed on Aug. 5, 2011, now Pat. No. 9,574,433.

(51) Int. Cl.
  *G01V 99/00*    (2009.01)
  *E21B 47/00*    (2012.01)
  *G01V 11/00*    (2006.01)

(52) U.S. Cl.
  CPC .......... *G01V 99/005* (2013.01); *E21B 47/00* (2013.01); *G01V 11/00* (2013.01)

(58) Field of Classification Search
  CPC .................... E21B 47/00; G01V 99/005
  USPC ......... 702/6, 13; 166/250.01, 252.1, 369.66; 703/10; 175/61
  See application file for complete search history.

(56) References Cited

U.S. PATENT DOCUMENTS

| | | | |
|---|---|---|---|
| 3,373,805 A | 3/1968 | Boberg et al. | |
| 5,881,811 A | 3/1999 | Lessi et al. | |
| 6,101,447 A | 8/2000 | Poe | |
| 6,758,289 B2 | 7/2004 | Kelley et al. | |
| 6,836,731 B1 * | 12/2004 | Whalley | E21B 49/00 702/13 |
| 7,963,327 B1 | 6/2011 | Saleri et al. | |
| 8,249,844 B2 | 8/2012 | Dale et al. | |
| 8,301,425 B2 | 10/2012 | Dale et al. | |
| 8,849,640 B2 | 9/2014 | Holl et al. | |
| 9,574,433 B2 * | 2/2017 | Bennett | E21B 47/00 |
| 2004/0050551 A1 | 3/2004 | Jones | |
| 2006/0251525 A1 | 11/2006 | Beck et al. | |
| 2009/0198477 A1 * | 8/2009 | Benish | E21B 43/00 703/10 |
| 2009/0260806 A1 | 10/2009 | Tseytlin | |
| 2010/0032165 A1 | 2/2010 | Bailey et al. | |
| 2010/0038086 A1 | 2/2010 | Bunnell et al. | |
| 2010/0114544 A1 | 5/2010 | Dogru | |
| 2010/0191516 A1 | 7/2010 | Benish et al. | |
| 2010/0299124 A1 | 11/2010 | Sun et al. | |
| 2011/0214878 A1 | 9/2011 | Bailey et al. | |
| 2014/0100797 A1 * | 4/2014 | Acharya | G01N 33/0031 702/24 |

OTHER PUBLICATIONS

Notice of Allowance for U.S. Appl. No. 13/204,438 dated Oct. 11, 2016.
Notice of Allowance for European Patent Application No. 12 821 951.6-1610 dated May 18, 2016.
European Extended Search Report for International Application No. PCT/US2012/049003 dated Sep. 21, 2015.
International Preliminary Report and Written Opinion for PCT/US2012/49003 dated Feb. 11, 2014.
Non-final Rejection for U.S. Appl. No. 13/204,438 dated Dec. 3, 2015.
Non-final Rejection for U.S. Appl. No. 13/204,438 dated Jan. 13, 2015.
Non-final Rejection for U.S. Appl. No. 13/204,438 dated Oct. 4, 2013.
Final Rejection for U.S. Appl. No. 13/204,438 dated Apr. 5, 2016.
Final Rejection for U.S. Appl. No. 13/204,438 dated Jul. 9, 2015.
Final Rejection for U.S. Appl. No. 13/204,438 dated Mar. 26, 2014.
International Search Report and Written Opinion for Application No. PCT/US2012/049003 dated Oct. 29, 2012.
Pakistani Office Action for Application No. 526/2012 dated Oct. 21, 2014.
Canadian Office Action for Application No. 2,847,208 dated Mar. 14, 2019.

* cited by examiner

*Primary Examiner* — John H Le
(74) *Attorney, Agent, or Firm* — Tumey L.L.P.

(57) ABSTRACT

A method determines the performance index of subterranean rock. In one embodiment, a performance index method determines a performance index for subterranean rock of an area. The area includes a well. The method includes determining a time period during producing the well. The method also includes determining the performance index from data of the time period from the equation $PI=(q/dd)*(cum./GPI)$. The term PI is the performance index, and the term q is the average daily rate of the well for the time period. The term dd is the average drawdown per day of the well for the time period, and the term cum. is the cumulative production of the well for the time period. The term GPI is the gross perforated interval of the well for the time period.

20 Claims, No Drawings

SYSTEM AND METHOD FOR QUANTIFYING STIMULATED ROCK QUALITY IN A WELLBORE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention

This invention relates to the field of oil and gas production and more specifically to the field of analyzing shale and tight rock oil and gas fields by quantifying differences in rock quality within a hydrocarbon bearing reservoir.

Background of the Invention

Due to the increased need for more efficient ways to develop oil and gas fields, a variety of different development strategies have been developed. For instance, conventional development strategies include well spacing, wellbore stimulation software, and like strategies. Drawbacks to such conventional methods include inefficiencies in accurately defining differences between rock qualities in the reservoir, which may lead to inefficient field development. Additional drawbacks include inefficiencies in quantifying differences in stimulated rock quality within a reservoir, which may lead to an insufficient or excessive number of wells drilled and completed in an area as well as inefficient development planning aimed to maximize profitability from predicted performance. Further drawbacks include inefficiencies in normalizing well performance data for analysis when wells are operated on different choke sizes. Drawbacks also include inefficiencies in determining the optimum fracture stimulation design, including optimum amounts of certain stimulation materials, for a defined performance area by incompletely defining the comparable stimulated rock quality areas. It is to be understood that the optimum completion design may vary with changes in rock quality within a reservoir.

Consequently, there is a need for improved methods for quantifying differences in stimulated rock quality. Further needs include improved methods for analyzing stimulated rock qualities.

BRIEF SUMMARY OF SOME OF THE PREFERRED EMBODIMENTS

These and other needs in the art are addressed in one embodiment by a method that determines the performance index of subterranean rock. In one embodiment, a performance index method determines a performance index for subterranean rock of an area. The area includes a well. The method includes determining a time period during producing the well. The method also includes determining the performance index using data of the time period from the equation $PI=(q/dd)*(cum./GPI)$. The term PI is the performance index, and the term q is the average daily rate of the well for the time period. The term dd is the average drawdown per day of the well for the time period, and the term cum. is the cumulative production of the well for the time period. The term GPI is the gross perforated interval of the well for the time period.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE PREFERRED EMBODIMENTS

In an embodiment, a performance index method quantifies differences in stimulated rock quality in reservoirs of a desired area. The performance index method includes determining a performance index (PI) for all producing wells within the reservoir. In a further embodiment, once determined, the wells belonging to a range of PI values are grouped together, thereby defining the stimulated rock quality of an area of the reservoir, which is referred to as a performance area. Without limitation, an advantage may be created when the groupings are mapped, which provides visual differentiation of the rock quality changes by identifying the clustering of wells of a certain performance. Further, without limitation, such an advantage may lead to an additional advantage including that each fully defined performance area may be evaluated using a reservoir simulator to yield a set of EURs and drainage areas that may correspond to a number of development scenarios (i.e., four wells per section, five wells per section, up to twelve wells per section). Such EURs and scenarios may be entered into an economics calculating program for evaluation of the different investment scenarios. In embodiments, the higher PI that is determined for an area, the fewer wells that may be needed for efficient drainage of desirable fluids from the area. Without limitation, when coupled with reservoir simulation results and economic analyses, the determined performance areas may provide how many wells for the area may be desired to maximize profitability. For instance, without limitation, an embodiment of the performance index method includes that for optimizing the number of wells to drill in a desired area, the determined PI provides that five wells are optimum in a desired area for a PI greater than sixty-five, six wells are optimum in a desired area for a PI from twenty-one to sixty-five, seven wells are optimum in a desired area for a PI from twelve to twenty, and eight or more wells are optimum in a desired area for a PI from zero to eleven. For example only, Table A below provides an illustrative example of performance areas for such an instance.

TABLE A

| Performance Area | PI | Optimum Wells/Section |
|---|---|---|
| A | >65 | 5 |
| B | 51-65 | 6 |
| C | 31-50 | 6 |

TABLE A-continued

| Performance Area | PI | Optimum Wells/Section |
|---|---|---|
| D | 21-30 | 6 |
| E | 12-20 | 7 |
| F | 0-11 | 8+ |

In an embodiment, a desirable PI is greater than thirty, although, without limitation, most wells with a PI greater than eleven are profitable (i.e., for instance, using any 2010 NYMEX® price file). Additional advantages include, without limitation, that desired quality rock may predict efficient and more profitable production because the desirable rock readily fractures and propagates, and/or has more natural fractures to propagate. A lower quality performance area (for various reasons) may absorb the treating pressure in a more ductile manner, which may create less productive surface area and may cause a less profitable investment. In addition, an advantage includes, without limitation, that the determined PI facilitates normalization of performance data (e.g., production rates and pressures) for wells operated on different choke sizes, which may be used when defining the extents of a performance area by evaluating wells operated on different choke sizes or when making well performance comparisons between wells operated on different choke sizes. Additionally, without limitation, a defined performance area facilitates analysis for optimizing a fracture stimulation design including facilitating the determination of optimum amounts of certain stimulation materials. It is to be understood that optimum amounts of stimulation materials are found to be different for different rock qualities. In some embodiments, the PI of any two like wells (i.e., one well having an optimum completion design and another not) may only vary up to four PI units. Without limitation, such effect may change the extents of a defined performance area, but identification of this effect may prevent such misleading change. It is to be further understood that desirable fluids include hydrocarbons such as oil and natural gas. In an embodiment, the hydrocarbons are natural gas. It is also to be understood that stimulation materials include water, friction reducers, linear and cross-linked gels, and proppant.

The desired area may include any oil and gas fields such as conventional oil and gas fields and shale and tight rock fields. In embodiments, the desired area includes dry and wet gas fields. In some embodiments, the desired area includes dry and wet gas fields that are fracture stimulated for production.

In embodiments, the performance index method includes determining PI from the following equation:

$$PI=(q/dd)*(cum./GPI).$$

In the equation, the term q refers to an average daily rate for a time period. For instance, the term q may have the units of Mmscfd (e.g., million standard cubic feet per day). The term dd refers to an average drawdown per day for a time period. For instance, the term dd may have the units of psi/day (e.g., pounds per square inch per day). The term cum. refers to cumulative production for a time period. For instance, the term cum. may have the units of Mmscf (e.g., million standard cubic feet). It is to be understood that the time period is a period of days. The term GPI refers to gross perforated interval. The GPI is the lateral length of a well (e.g., the distance between the top (or first) and bottom (or last) perforation). In embodiments in which the well that was used to provide the data for the equation is fracture stimulated, the GPI is the treated lateral length of the well. The term GPI may have the units of kft (e.g., thousand feet). It is to be understood that in embodiments about the entire interval is treated. It is to be further understood that treated refers to fracture stimulated treatments performed on the well by pumping stimulation material under pressure. Without limitation, examples of pressure treatments include fracture stimulation.

The data for q, dd, and cum. are taken from gross recorded production data of each well in the desired area. In embodiments, the recorded data is the first sixty days of production data. In some embodiments, when applying the equation, all of the wells used in the desired area for the equation have similar pressure treatments. In an embodiment, all of the wells used when applying the equation for a desired area have between about 8,000 psi and about 12,000 psi average surface treatment pressures. However, it is to be understood that the equation is not limited to wells that have had similar pressure treatments.

In embodiments, the time period is the same for q, dd, and cum. In embodiments, the time period for each well begins (the beginning day) on the day that the highest flowing wellhead pressure is achieved after the first day that a stable water yield occurs. Stable water yield refers to consistent well behavior in water production per unit gas produced. Without being limited by theory, embodiments include a stable water yield because water creates hydrostatic pressure that is detrimental to the reservoir in directing steady production to the surface. In an embodiment, the time period ends (the ending day) on a day from about the minimum day to about the maximum day after the beginning day (i.e., the day on which the time period begins). In an embodiment, the minimum day is the day in which a minimum amount of daily drawdown to define the flow capacity of the wellbore is available. In embodiments, the minimum day is about twenty days or about thirty days after the beginning day. The maximum day represents the last day necessary to evaluate a well's production in order to define the flow capacity of the well, and therefore, the stimulated rock quality. In an embodiment, the maximum day is from about thirty days to about forty days from the beginning day. In an embodiment, the time period is about thirty days from the beginning day. Without being limited by theory, a minimum day or maximum day (e.g., thirty days from the beginning day) is used because it may be desired to measure the flow capacity of the formation (e.g., the stimulated reservoir volume) and not of the effectiveness of proppant. For instance, without being limited by theory, if measuring PI too long after fracturing and producing from the well, the PI measurement may be driven more by the ability of the proppant to maintain open fractures (i.e., due to overburden pressure) rather than the flow capacity of the stimulated reservoir volume, which may be the desired measurement. For instance, without limitation, too long after fracturing and producing the well may be beyond about 3,000 psi to beyond about 4,000 psi of drawdown from the initial flowing wellhead pressure at initial production, where the initial flowing wellhead pressure may be about 6,000 psi to about 9,000 psi in the reservoir of application.

In alternative embodiments, the time period may be selected based on choke sizes. In some alternative embodiments, the time period may be fewer days when a large choke is used because a stable water yield may be achieved quicker, alternatively the time period may be more days when a small choke is used. It is to be understood that a large choke refers to a choke that is 18/64ths of an inch and larger. It is to be further understood that a small choke refers to a choke that is smaller than 18/64ths of an inch. In an alternative embodiment, the time period for a large choke is from about twenty days to about thirty days. In alternative embodiments, the time period for a small choke is from about thirty days to about forty days.

In some embodiments, the performance index method includes optimizing the time period. In embodiments, optimizing the time period includes removing data from consideration for the equation for days in which abnormal well flowing behavior is exhibited in relation to other days in the time period for the well. For instance, abnormal well behavior includes days in which the well has an abnormally high pressure (i.e., pressures higher than that of the nearest previous producing day). For instance, in some embodiments, an abnormally high pressure day includes the day or partial day when the well is shut down. In an embodiment, optimizing the time period includes removing data from the equation for days in which the well has an abnormally low pressure (i.e., pressure that cause significant deviations from daily drawdown trends, usually due to a temporary operational condition or a pressure recorded at a different time of the day than normally recorded). In some embodiments in which there may be various temporary conditions that may cause this, the cause is investigated to understand whether the data may or may not be removed. For instance, in some embodiments, an abnormally low pressure day includes days when the well is returned to production and/or is in the process of returning to production.

In an embodiment, a method determines the optimum number of wells per section for maximum present value. The method includes determining one well in the PI area (i.e., the desired area) to represent the area in terms of performance. Embodiments include modeling this well. In some embodiments, modeling includes history matching and forecasting using a reservoir simulator and then drainage area sensitivities performed to show the various recovery factors and EURs in a section with a different number of wells per section, typically beginning with four wells per section up to twelve wells per section. It is to be understood that EUR refers to estimated ultimate recovery. Embodiments include that for each modeled scenario, there is an average EUR per well. Such EUR values may be entered into an economic calculator (e.g., ARIES™ System Petroleum Economic Evaluation Software, ARIES™ is a trademark of Halliburton Energy Services, Inc.) along with their associated drilling and completion costs to show the scenario that maximizes profits. For example, without limitation, five wells per section may have an average EUR per well of 18 Bcf, and a D&C cost of $50 million (e.g., $10 million/well), which may result in a net present value of about $106 million. Comparatively, six wells in the same section may have an average EUR per well of 15 Bcf, and a D&C cost of $60 million, which may result in a net present value of about $102 million. Without limitation, defining rock quality changes facilitates developing the field with such method by determining the appropriate number of wells to be drilled in a section. In embodiments, the method further includes siting each well. As an example, if X number of wells per section (e.g., five) maximizes profits in an area, the well sites are located where the wells are equally spaced within the square mile (i.e., when the section is one square mile). In embodiments, Y (e.g., two) of the horizontal wells are drilled at a legal distance from two of the opposing section sides defined by the regulatory field rules. Without limitation, it is to be understood that changes may occur in the natural gas price file used (e.g., NYMEX® Strip, NYMEX® is a registered trademark of the New York Mercantile Exchange Corporation), thereby changing the economic outcomes. Further, without limitation, it is to be understood that the natural gas price file may change what is ideal as the prices change. Embodiments additionally include the profits also being dependent upon factors such as drilling and completion costs, operational costs such as lease operating expenses and fluid processing costs, tax costs, or any combinations thereof.

To further illustrate various illustrative embodiments, the following examples are provided.

Example 1

Table I shows the data from a previous well. The performance index method was used to determine the PI of the well as:

$$PI=(8.480/9)*(254.4/4.567)=52 \text{ Mmscf}^2/(\text{psig}*\text{kft}).$$

The first day of data in Table I was the first day of production for the well. Typically, there was an initial flow back period of about seven days prior to this data. During Apr. 13, 2010 and Apr. 14, 2010, the well was shut in for tubing installation. The thirty day time period used for the performance index equation was from Apr. 28, 2010 to May 27, 2010. From Apr. 22, 2010 to Apr. 27, 2010, it was seen that although the yield was somewhat stabilized, the flowing wellhead pressure had not established a stable decline until Apr. 28, 2010, which was the first day of the thirty day time period. In the thirty day time period (Apr. 28, 2010 to May 27, 2010), the yield was stabilized, and the pressure decline was established.

The data for the equation was optimized by omitting the days May 4, 2010, May 5, 2010, and May 6, 2010 from the equation data of the performance index method. The daily drawdown of such days showed abnormal well production. For instance, wells typically do not build 10 psi pressure and produce over 8.5 Mmscfd under normal flowing conditions. On the next day (May 5, 2010), the well produced similar gas volumes, but drew down more than a normal amount relative to the remainder of the data. On the third of the abnormal days (May 6, 2010), the data showed no drawdown and a similar gas volume, which was also abnormal well behavior. By optimizing the time period and removing the days May 4, 2010, May 5, 2010, and May 6, 2010, the data provided an average daily drawdown of 9 psig to use in the equation. It was seen that including data from the three days May 4, 2010, May 5, 2010, and May 6, 2010 also would give an average daily drawdown of 9 psig, which was one example of where it may be desired to not optimize the performance index method and obtain the same performance index by virtue of the averaging function.

TABLE I

| Date | Gas (Mscf) | Water (Bbls.) | Yield (BW/Mmscf) | FWHP (psig) | Daily drawdown |
| --- | --- | --- | --- | --- | --- |
| Mar. 29, 2010 | 9,025 | 298 | 33 | 8516 | |
| Mar. 30, 2010 | 9,311 | 227 | 24 | 8536 | |
| Mar. 31, 2010 | 9,531 | 191 | 20 | 8800 | |
| Apr. 1, 2010 | 5,884 | 73 | 12 | 8608 | |
| Apr. 2, 2010 | 8,758 | 131 | 15 | 8598 | |
| Apr. 3, 2010 | 8,831 | 120 | 14 | 8580 | |
| Apr. 4, 2010 | 8,824 | 90 | 10 | 8566 | |
| Apr. 5, 2010 | 8,855 | 104 | 12 | 8561 | |
| Apr. 6, 2010 | 8,879 | 80 | 9 | 8544 | |
| Apr. 7, 2010 | 8,890 | 80 | 9 | 8539 | |
| Apr. 8, 2010 | 7,821 | 68 | 9 | 8493 | |
| Apr. 9, 2010 | 6,580 | 111 | 17 | 8555 | |
| Apr. 10, 2010 | 8,947 | 63 | 7 | 8532 | |

TABLE I-continued

| Date | Gas (Mscf) | Water (Bbls.) | Yield (BW/Mmscf) | FWHP (psig) | Daily drawdown |
|---|---|---|---|---|---|
| Apr. 11, 2010 | 8,979 | 61 | 7 | 8525 | |
| Apr. 12, 2010 | 8,703 | 60 | 7 | 8703 | |
| Apr. 13, 2010 | 0 | 0 | 0 | 0 | |
| Apr. 14, 2010 | 0 | 0 | 0 | 0 | |
| Apr. 15, 2010 | 4,528 | 167 | 37 | 8497 | |
| Apr. 16, 2010 | 8,900 | 82 | 9 | 8475 | |
| Apr. 17, 2010 | 8,824 | 105 | 12 | 8447 | |
| Apr. 18, 2010 | 8,766 | 115 | 13 | 8461 | |
| Apr. 19, 2010 | 8,805 | 120 | 14 | 8489 | |
| Apr. 20, 2010 | 8,791 | 101 | 11 | 8411 | |
| Apr. 21, 2010 | 8,693 | 88 | 10 | 8372 | |
| Apr. 22, 2010 | 8,484 | 48 | 6 | 8436 | |
| Apr. 23, 2010 | 8,460 | 50 | 6 | 8372 | |
| Apr. 24, 2010 | 8,678 | 32 | 4 | 8320 | |
| Apr. 25, 2010 | 8,642 | 44 | 5 | 8350 | |
| Apr. 26, 2010 | 8,627 | 32 | 4 | 8305 | |
| Apr. 27, 2010 | 8,604 | 46 | 5 | 8377 | |
| Apr. 28, 2010 | 8,588 | 33 | 4 | 8282 | |
| Apr. 29, 2010 | 8,571 | 41 | 5 | 8275 | 7 |
| Apr. 30, 2010 | 8,562 | 36 | 4 | 8261 | 14 |
| May 1, 2010 | 8,563 | 37 | 4 | 8252 | 9 |
| May 2, 2010 | 8,543 | 43 | 5 | 8242 | 10 |
| May 3, 2010 | 8,544 | 40 | 5 | 8237 | 5 |
| May 4, 2010 | 8,556 | 41 | 5 | 8247 | −10 |
| May 5, 2010 | 8,534 | 28 | 3 | 8215 | 32 |
| May 6, 2010 | 8,535 | 40 | 5 | 8215 | 0 |
| May 7, 2010 | 8,624 | 32 | 4 | 8194 | 21 |
| May 8, 2010 | 8,571 | 42 | 5 | 8184 | 10 |
| May 9, 2010 | 8,503 | 38 | 4 | 8172 | 12 |
| May 10, 2010 | 8,490 | 34 | 4 | 8168 | 4 |
| May 11, 2010 | 8,481 | 38 | 4 | 8156 | 12 |
| May 12, 2010 | 8,465 | 32 | 4 | 8152 | 4 |
| May 13, 2010 | 8,471 | 28 | 3 | 8140 | 12 |
| May 14, 2010 | 8,451 | 33 | 4 | 8133 | 7 |
| May 15, 2010 | 8,444 | 30 | 4 | 8122 | 11 |
| May 16, 2010 | 8,440 | 37 | 4 | 8115 | 7 |
| May 17, 2010 | 8,443 | 33 | 4 | 8110 | 5 |
| May 18, 2010 | 8,446 | 42 | 5 | 8097 | 13 |
| May 19, 2010 | 8,431 | 38 | 5 | 8092 | 5 |
| May 20, 2010 | 8,421 | 26 | 3 | 8083 | 9 |
| May 21, 2010 | 8,423 | 34 | 4 | 8074 | 9 |
| May 22, 2010 | 8,416 | 30 | 4 | 8065 | 9 |
| May 23, 2010 | 8,398 | 31 | 4 | 8063 | 2 |
| May 24, 2010 | 8,385 | 34 | 4 | 8050 | 13 |
| May 25, 2010 | 8,380 | 34 | 4 | 8039 | 11 |
| May 26, 2010 | 8,381 | 34 | 4 | 8032 | 7 |
| May 27, 2010 | 8,349 | 28 | 3 | 8023 | 9 |
| Average | 8,480 | | | | 9 |

Example 2

Table II shows the data from a previous well. The performance index method was used to determine the PI of the well as:

$$PI = (8.644/11) \ast (259.3/4.436) = 46 \text{ Mmscf}^2/(\text{psig} \ast \text{kft}).$$

The same generalities of Example 1 apply to this Example 2. In regards to the drawdown, since the values were not all relatively consistent, there were two ways to calculate the drawdown value used in the equation and arrive at the same conclusion. The first method was to optimize and omit the days Oct. 22, 2009, Oct. 24, 2009, Oct. 25, 2009, Oct. 31, 2009, Nov. 1, 2009, Nov. 14, 2009, and Nov. 15, 2009. Such days were omitted due to abnormal well behavior, and the average was 11 psig. The second method was to subtract the last FWHP value from the second FWHP value in the time period and divide that difference by 29 (e.g., the number of producing days between them). Therefore, the second method was 8,337−8,025=312, and then 312 was divided by 29 to obtain 11 psig. The first day was omitted because the drawdown value between the first two days of the time period was abnormal. It may also be observed that on Nov. 3, 2009 the well built pressure, but the data for such day was not omitted from the averaging calculation because Nov. 3, 2009 was not preceded or followed by a larger than normal drawdown. This may be an indication that the well was shut down for a small portion of the day for an operational reason. The thirty day time period used for the performance index equation was from Oct. 21, 2009 to Nov. 19, 2009. From Oct. 3, 2009 to Oct. 20, 2009, it was seen that although the yield was somewhat stabilized, the flowing wellhead pressure had not established a stable decline until Oct. 21, 2009, which was the first day of the thirty day time period.

TABLE II

| Date | Gas (Mscf) | Water (Bbls.) | Yield (BW/Mmscf) | FWHP (psig) | Daily Drawdown |
|---|---|---|---|---|---|
| Sep. 14, 2009 | 1,795 | 773 | 431 | 8289 | |
| Sep. 15, 2009 | 5,111 | 431 | 84 | 8289 | |
| Sep. 16, 2009 | 7,543 | 366 | 49 | 8597 | |
| Sep. 17, 2009 | 8,059 | 323 | 40 | 8593 | |
| Sep. 18, 2009 | 8,013 | 334 | 42 | 8614 | |
| Sep. 19, 2009 | 8,180 | 323 | 39 | 8615 | |
| Sep. 20, 2009 | 8,275 | 303 | 37 | 8613 | |
| Sep. 21, 2009 | 8,349 | 279 | 33 | 8625 | |
| Sep. 22, 2009 | 8,337 | 247 | 30 | 8641 | |
| Sep. 23, 2009 | 8,662 | 229 | 26 | 8652 | |
| Sep. 24, 2009 | 8,669 | 209 | 24 | 8664 | |
| Sep. 25, 2009 | 8,884 | 190 | 21 | 8671 | |
| Sep. 26, 2009 | 8,976 | 187 | 21 | 8685 | |
| Sep. 27, 2009 | 9,066 | 132 | 15 | 8688 | |
| Sep. 28, 2009 | 9,090 | 119 | 13 | 8681 | |
| Sep. 29, 2009 | 9,114 | 135 | 15 | 8676 | |
| Sep. 30, 2009 | 9,161 | 103 | 11 | 8677 | |
| Oct. 1, 2009 | 8,209 | 104 | 13 | 8733 | |
| Oct. 2, 2009 | 5,251 | 42 | 8 | 8711 | |
| Oct. 3, 2009 | 8,961 | 59 | 7 | 8694 | |
| Oct. 4, 2009 | 8,962 | 71 | 8 | 8529 | |
| Oct. 5, 2009 | 8,961 | 61 | 7 | 8474 | |
| Oct. 6, 2009 | 8,983 | 56 | 6 | 8421 | |
| Oct. 7, 2009 | 9,020 | 53 | 6 | 8528 | |
| Oct. 8, 2009 | 8,974 | 48 | 5 | 8513 | |
| Oct. 9, 2009 | 8,969 | 42 | 5 | 8502 | |
| Oct. 10, 2009 | 8,949 | 44 | 5 | 8489 | |
| Oct. 11, 2009 | 8,961 | 50 | 6 | 8478 | |
| Oct. 12, 2009 | 8,930 | 41 | 5 | 8483 | |
| Oct. 13, 2009 | 8,927 | 45 | 5 | 8113 | |
| Oct. 14, 2009 | 8,871 | 36 | 4 | 8435 | |
| Oct. 15, 2009 | 8,867 | 35 | 4 | 8425 | |
| Oct. 16, 2009 | 8,863 | 45 | 5 | 8410 | |
| Oct. 17, 2009 | 8,816 | 28 | 3 | 8401 | |
| Oct. 18, 2009 | 8,876 | 31 | 3 | 8386 | |
| Oct. 19, 2009 | 8,764 | 23 | 3 | 8764 | |
| Oct. 20, 2009 | 8,856 | 21 | 2 | 7666 | |
| Oct. 21, 2009 | 8,897 | 21 | 2 | 8439 | |
| Oct. 22, 2009 | 8,891 | 30 | 3 | 8337 | 102 |
| Oct. 23, 2009 | 8,888 | 35 | 4 | 8326 | 11 |
| Oct. 24, 2009 | 8,883 | 25 | 3 | 8364 | −38 |
| Oct. 25, 2009 | 8,863 | 44 | 5 | 8304 | 60 |
| Oct. 26, 2009 | 8,806 | 31 | 4 | 8291 | 13 |
| Oct. 27, 2009 | 8,777 | 28 | 3 | 8281 | 10 |
| Oct. 28, 2009 | 8,783 | 31 | 4 | 8267 | 14 |
| Oct. 29, 2009 | 8,787 | 30 | 3 | 8254 | 13 |
| Oct. 30, 2009 | 8,775 | 28 | 3 | 8239 | 15 |
| Oct. 31, 2009 | 8,775 | 30 | 3 | 8352 | −113 |
| Nov. 1, 2009 | 8,774 | 24 | 3 | 8221 | 131 |
| Nov. 2, 2009 | 8,757 | 23 | 3 | 8204 | 17 |
| Nov. 3, 2009 | 5,389 | 25 | 5 | 8251 | −47 |
| Nov. 4, 2009 | 8,835 | 28 | 3 | 8228 | 23 |
| Nov. 5, 2009 | 8,878 | 21 | 2 | 8212 | 16 |
| Nov. 6, 2009 | 8,841 | 35 | 4 | 8186 | 26 |
| Nov. 7, 2009 | 8,815 | 23 | 3 | 8174 | 12 |
| Nov. 8, 2009 | 8,786 | 21 | 2 | 8164 | 10 |
| Nov. 9, 2009 | 8,779 | 26 | 3 | 8147 | 17 |
| Nov. 10, 2009 | 8,761 | 26 | 3 | 8130 | 17 |

TABLE II-continued

| Date | Gas (Mscf) | Water (Bbls.) | Yield (BW/Mmscf) | FWHP (psig) | Daily Drawdown |
|---|---|---|---|---|---|
| Nov. 11, 2009 | 8,715 | 28 | 3 | 8123 | 7 |
| Nov. 12, 2009 | 8,670 | 22 | 3 | 8108 | 15 |
| Nov. 13, 2009 | 8,660 | 16 | 7 | 8099 | 9 |
| Nov. 14, 2009 | 8,612 | 21 | 2 | 8037 | 62 |
| Nov. 15, 2009 | 8,559 | 26 | 3 | 8071 | −34 |
| Nov. 16, 2009 | 8,615 | 33 | 4 | 8055 | 16 |
| Nov. 17, 2009 | 8,522 | 35 | 4 | 8048 | 7 |
| Nov. 18, 2009 | 8,595 | 28 | 3 | 8036 | 12 |
| Nov. 19, 2009 | 8,622 | 25 | 3 | 8025 | 11 |
| Average | 8,644 | | | | 11 |

Example 3

Table III shows the data from a previous well. The performance index method was used to determine the PI of the well as:

$$PI=(8.537/11)*(256.1/4.630)=43 \text{ Mmscf}^2/(psig*kft).$$

The same generalities of Example 1 apply to this Example 3. The thirty day time period of May 5, 2010 to Jun. 3, 2010 was chosen when the first stable yield was observed. The optimization omitted only days May, 28, 2010, May 29, 2010, and May 30, 2010 due to abnormal well behavior as exhibited by the daily drawdowns for such days. The analysis for this Example 3 was completed in 47 production days and less than 600 psi total drawdown from the highest initial production pressure of the well.

TABLE III

| Date | Gas (Mscf) | Water (Bbls.) | Yield (BW/Mmscf) | FWHP (psig) | Daily Drawdown |
|---|---|---|---|---|---|
| Apr. 18, 2010 | 3,085 | 1,029 | 334 | 8089 | |
| Apr. 19, 2010 | 4,689 | 804 | 171 | 8255 | |
| Apr. 20, 2010 | 5,267 | 686 | 130 | 8328 | |
| Apr. 21, 2010 | 6,081 | 627 | 103 | 8545 | |
| Apr. 22, 2010 | 6,572 | 522 | 79 | 8646 | |
| Apr. 23, 2010 | 7,004 | 501 | 72 | 8707 | |
| Apr. 24, 2010 | 7,410 | 482 | 65 | 8743 | |
| Apr. 25, 2010 | 7,673 | 326 | 42 | 9000 | |
| Apr. 26, 2010 | 7,907 | 359 | 45 | 9000 | |
| Apr. 27, 2010 | 8,013 | 341 | 43 | 8786 | |
| Apr. 28, 2010 | 8,055 | 346 | 43 | 8787 | |
| Apr. 29, 2010 | 8,121 | 308 | 38 | 8784 | |
| Apr. 30, 2010 | 8,237 | 298 | 36 | 8798 | |
| May 1, 2010 | 8,433 | 270 | 32 | 8784 | |
| May 2, 2010 | 8,506 | 250 | 29 | 8785 | |
| May 3, 2010 | 8,658 | 232 | 27 | 8789 | |
| May 4, 2010 | 8,699 | 183 | 21 | 8767 | |
| May 5, 2010 | 8,679 | 130 | 15 | 8752 | |
| May 6, 2010 | 8,615 | 170 | 20 | 8734 | 18 |
| May 7, 2010 | 8,581 | 182 | 21 | 8725 | 9 |
| May 8, 2010 | 8,576 | 175 | 20 | 8722 | 3 |
| May 9, 2010 | 8,575 | 160 | 19 | 8697 | 25 |
| May 10, 2010 | 8,576 | 173 | 20 | 8688 | 9 |
| May 11, 2010 | 8,580 | 165 | 19 | 8680 | 8 |
| May 12, 2010 | 8,613 | 168 | 20 | 8664 | 16 |
| May 13, 2010 | 8,642 | 160 | 19 | 8654 | 10 |
| May 14, 2010 | 8,648 | 166 | 19 | 8643 | 11 |
| May 15, 2010 | 8,681 | 110 | 13 | 8630 | 13 |
| May 16, 2010 | 8,689 | 122 | 14 | 8624 | 6 |
| May 17, 2010 | 8,686 | 130 | 15 | 8614 | 10 |
| May 18, 2010 | 8,690 | 133 | 15 | 8606 | 8 |
| May 19, 2010 | 8,569 | 134 | 16 | 8590 | 16 |
| May 20, 2010 | 8,535 | 94 | 11 | 8579 | 11 |
| May 21, 2010 | 8,538 | 139 | 16 | 8570 | 9 |
| May 22, 2010 | 8,539 | 116 | 14 | 8569 | 1 |
| May 23, 2010 | 8,548 | 99 | 12 | 8549 | 20 |

TABLE III-continued

| Date | Gas (Mscf) | Water (Bbls.) | Yield (BW/Mmscf) | FWHP (psig) | Daily Drawdown |
|---|---|---|---|---|---|
| May 24, 2010 | 8,542 | 125 | 15 | 8541 | 8 |
| May 25, 2010 | 8,545 | 113 | 13 | 8535 | 6 |
| May 26, 2010 | 8,538 | 113 | 13 | 8526 | 9 |
| May 27, 2010 | 8,537 | 127 | 15 | 8511 | 15 |
| May 28, 2010 | 8,532 | 112 | 13 | 8522 | −11 |
| May 29, 2010 | 7,897 | 117 | 15 | 8615 | −93 |
| May 30, 2010 | 8,151 | 85 | 10 | 8492 | 123 |
| May 31, 2010 | 8,468 | 103 | 12 | 8482 | 10 |
| Jun. 1, 2010 | 8,460 | 98 | 12 | 8470 | 12 |
| Jun. 2, 2010 | 8,450 | 112 | 13 | 8455 | 15 |
| Jun. 3, 2010 | 8,435 | 109 | 13 | 8444 | 11 |
| Average | 8,537 | | | | 11 |

Example 4

Table IV shows the data from a previous well. The performance index method was used to determine the PI of the well as:

$$PI=(10.894/12)*(326.8/4.565)=65 \text{ Mmscf}^2/(psig*kft).$$

The same generalities of Example 1 apply to this Example 4. The thirty day time period of Aug. 24, 2010 to Sep. 22, 2010 was chosen days after production tubing was installed on Aug. 18, 2010. The optimization analysis had minimal daily drawdown pressure to omit as only days Aug. 26, 2010, Aug. 27, 2010, and Aug. 28, 2010 were due to abnormal well behavior as exhibited by the daily drawdowns for such days.

TABLE IV

| Date | Gas (Mscf) | Water (Bbls.) | Yield (BW/Mmscf) | FWHP (psig) | Daily Drawdown |
|---|---|---|---|---|---|
| Jul. 28, 2010 | 5,403 | 419 | 78 | 8395 | |
| Jul. 29, 2010 | 7,390 | 306 | 41 | 8346 | |
| Jul. 30, 2010 | 10,184 | 195 | 19 | 8405 | |
| Jul. 31, 2010 | 10,449 | 105 | 10 | 8511 | |
| Aug. 1, 2010 | 10,787 | 80 | 7 | 8541 | |
| Aug. 2, 2010 | 10,995 | 65 | 6 | 8536 | |
| Aug. 3, 2010 | 10,996 | 89 | 8 | 8538 | |
| Aug. 4, 2010 | 11,288 | 85 | 8 | 8535 | |
| Aug. 5, 2010 | 11,400 | 97 | 9 | 8540 | |
| Aug. 6, 2010 | 11,476 | 81 | 7 | 8541 | |
| Aug. 7, 2010 | 11,325 | 75 | 7 | 8520 | |
| Aug. 8, 2010 | 11,536 | 87 | 8 | 8506 | |
| Aug. 9, 2010 | 11,565 | 79 | 7 | 8495 | |
| Aug. 10, 2010 | 11,517 | 81 | 7 | 8509 | |
| Aug. 11, 2010 | 10,754 | 88 | 8 | 8524 | |
| Aug. 12, 2010 | 8,795 | 96 | 11 | 8489 | |
| Aug. 13, 2010 | 11,660 | 88 | 8 | 8476 | |
| Aug. 14, 2010 | 11,633 | 68 | 6 | 8467 | |
| Aug. 15, 2010 | 11,622 | 85 | 7 | 8452 | |
| Aug. 16, 2010 | 10,393 | 71 | 7 | 8700 | |
| Aug. 17, 2010 | 0 | 0 | 0 | 0 | |
| Aug. 18, 2010 | 0 | 0 | 0 | 8234 | |
| Aug. 19, 2010 | 7,265 | 91 | 13 | 8217 | |
| Aug. 20, 2010 | 10,958 | 87 | 8 | 8247 | |
| Aug. 21, 2010 | 11,300 | 77 | 7 | 8242 | |
| Aug. 22, 2010 | 11,362 | 71 | 6 | 8231 | |
| Aug. 23, 2010 | 11,390 | 87 | 8 | 8242 | |
| Aug. 24, 2010 | 11,309 | 77 | 7 | 8227 | |
| Aug. 25, 2010 | 11,273 | 79 | 7 | 8217 | 10 |
| Aug. 26, 2010 | 11,303 | 73 | 6 | 8191 | 26 |
| Aug. 27, 2010 | 11,317 | 71 | 6 | 8189 | 2 |
| Aug. 28, 2010 | 11,318 | 68 | 6 | 8191 | −2 |
| Aug. 29, 2010 | 11,319 | 74 | 7 | 8181 | 10 |
| Aug. 30, 2010 | 11,258 | 69 | 6 | 8164 | 17 |
| Aug. 31, 2010 | 10,563 | 71 | 7 | 8153 | 11 |

TABLE IV-continued

| Date | Gas (Mscf) | Water (Bbls.) | Yield (BW/Mmscf) | FWHP (psig) | Daily Drawdown |
|---|---|---|---|---|---|
| Sep. 1, 2010 | 10,752 | 64 | 6 | 8136 | 17 |
| Sep. 2, 2010 | 10,851 | 67 | 6 | 8123 | 13 |
| Sep. 3, 2010 | 10,919 | 65 | 6 | 8110 | 13 |
| Sep. 4, 2010 | 10,994 | 62 | 6 | 8099 | 11 |
| Sep. 5, 2010 | 10,985 | 64 | 6 | 8084 | 15 |
| Sep. 6, 2010 | 10,924 | 58 | 5 | 8072 | 12 |
| Sep. 7, 2010 | 10,968 | 62 | 6 | 8064 | 8 |
| Sep. 8, 2010 | 10,986 | 59 | 5 | 8050 | 14 |
| Sep. 9, 2010 | 10,988 | 57 | 5 | 8044 | 6 |
| Sep. 10, 2010 | 10,971 | 51 | 5 | 8026 | 18 |
| Sep. 11, 2010 | 10,938 | 55 | 5 | 8013 | 13 |
| Sep. 12, 2010 | 10,945 | 49 | 5 | 7998 | 15 |
| Sep. 13, 2010 | 10,930 | 45 | 4 | 7988 | 10 |
| Sep. 14, 2010 | 10,888 | 40 | 4 | 7982 | 6 |
| Sep. 15, 2010 | 10,865 | 44 | 4 | 7967 | 15 |
| Sep. 16, 2010 | 10,718 | 41 | 4 | 7961 | 6 |
| Sep. 17, 2010 | 9,304 | 43 | 5 | 7949 | 12 |
| Sep. 18, 2010 | 10,665 | 44 | 4 | 7937 | 12 |
| Sep. 19, 2010 | 10,642 | 48 | 5 | 7927 | 10 |
| Sep. 20, 2010 | 10,626 | 41 | 4 | 7918 | 9 |
| Sep. 21, 2010 | 10,623 | 44 | 4 | 7907 | 11 |
| Sep. 22, 2010 | 10,686 | 42 | 4 | 7890 | 17 |
| Average | 10,894 | | | | 12 |

Example 5

Table V shows the data from a previous well, and Table VI shows the data from another previous well. The performance index method was used to determine the PI of the well of Table V as:

$$PI=(9.075/20)*(272.3/4.624)=27 \; Mmscf^2/(psig*kft).$$

The performance index method was used to determine the PI of the well of Table VI as:

$$PI=(16.526/65)*(495.8/4.619)=27 \; Mmscf^2/(psig*kft).$$

TABLE V

| Date | Gas (Mscf) | Water (Bbls.) | Yield (BW/Mmscf) | FWHP (psig) | Daily Drawdown |
|---|---|---|---|---|---|
| Jul. 21, 2009 | 2,646 | 1,470 | 556 | 7825 | |
| Jul. 22, 2009 | 4,096 | 1,242 | 303 | 8461 | |
| Jul. 23, 2009 | 5,448 | 937 | 172 | 8717 | |
| Jul. 24, 2009 | 6,327 | 754 | 119 | 8822 | |
| Jul. 25, 2009 | 6,938 | 635 | 92 | 8927 | |
| Jul. 26, 2009 | 7,502 | 565 | 75 | 8913 | |
| Jul. 27, 2009 | 7,873 | 489 | 62 | 8982 | |
| Jul. 28, 2009 | 7,853 | 403 | 51 | 9034 | |
| Jul. 29, 2009 | 8,336 | 364 | 44 | 9014 | |
| Jul. 30, 2009 | 4,880 | 175 | 36 | 9025 | |
| Jul. 31, 2009 | 4,064 | 84 | 21 | 8522 | |
| Aug. 1, 2009 | 0 | 0 | 0 | 8522 | |
| Aug. 2, 2009 | 0 | 0 | 0 | 8522 | |
| Aug. 3, 2009 | 0 | 0 | 0 | 8522 | |
| Aug. 4, 2009 | 838 | 120 | 143 | 9200 | |
| Aug. 5, 2009 | 7,782 | 432 | 56 | 8940 | |
| Aug. 6, 2009 | 10,381 | 371 | 36 | 8872 | |
| Aug. 7, 2009 | 10,563 | 283 | 27 | 8864 | |
| Aug. 8, 2009 | 10,529 | 262 | 25 | 8793 | |
| Aug. 9, 2009 | 10,722 | 165 | 15 | 8754 | |
| Aug. 10, 2009 | 10,715 | 168 | 16 | 8641 | |
| Aug. 11, 2009 | 11,171 | 160 | 14 | 8610 | |
| Aug. 12, 2009 | 9,638 | 178 | 18 | 8649 | |
| Aug. 13, 2009 | 10,037 | 137 | 14 | 8622 | |
| Aug. 14, 2009 | 10,342 | 181 | 18 | 8580 | |
| Aug. 15, 2009 | 10,314 | 113 | 11 | 8609 | |
| Aug. 16, 2009 | 9,976 | 130 | 13 | 8609 | |
| Aug. 17, 2009 | 9,362 | 120 | 13 | 8547 | |
| Aug. 18, 2009 | 9,805 | 118 | 12 | 8498 | |
| Aug. 19, 2009 | 10,048 | 144 | 14 | 8440 | |
| Aug. 20, 2009 | 9,723 | 107 | 11 | 8443 | |
| Aug. 21, 2009 | 10,135 | 136 | 13 | 8398 | |
| Aug. 22, 2009 | 10,099 | 126 | 12 | 8415 | |
| Aug. 23, 2009 | 9,873 | 130 | 13 | 8395 | 20 |
| Aug. 24, 2009 | 9,785 | 108 | 11 | 8339 | 56 |
| Aug. 25, 2009 | 9,698 | 102 | 11 | 8276 | 63 |
| Aug. 26, 2009 | 9,051 | 109 | 12 | 8407 | −131 |
| Aug. 27, 2009 | 8,658 | 92 | 11 | 8385 | 22 |
| Aug. 28, 2009 | 8,747 | 93 | 11 | 8363 | 22 |
| Aug. 29, 2009 | 8,767 | 88 | 10 | 8346 | 17 |
| Aug. 30, 2009 | 8,795 | 93 | 11 | 8329 | 17 |
| Aug. 31, 2009 | 8,819 | 97 | 11 | 8305 | 24 |
| Sep. 1, 2009 | 8,839 | 87 | 10 | 8278 | 27 |
| Sep. 2, 2009 | 8,888 | 86 | 10 | 8256 | 22 |
| Sep. 3, 2009 | 8,908 | 72 | 8 | 8232 | 24 |
| Sep. 4, 2009 | 8,915 | 42 | 5 | 8222 | 10 |
| Sep. 5, 2009 | 8,908 | 67 | 8 | 8195 | 27 |
| Sep. 6, 2009 | 8,902 | 66 | 7 | 8178 | 17 |
| Sep. 7, 2009 | 8,933 | 59 | 7 | 8383 | −205 |
| Sep. 8, 2009 | 8,319 | 45 | 5 | 8139 | 244 |
| Sep. 9, 2009 | 8,927 | 46 | 5 | 8116 | 23 |
| Sep. 10, 2009 | 8,996 | 49 | 5 | 8086 | 30 |
| Sep. 11, 2009 | 9,036 | 64 | 7 | 8057 | 29 |
| Sep. 12, 2009 | 9,050 | 67 | 7 | 8038 | 19 |
| Sep. 13, 2009 | 9,107 | 64 | 7 | 8011 | 27 |
| Sep. 14, 2009 | 9,152 | 97 | 11 | 7971 | 40 |
| Sep. 15, 2009 | 9,203 | 57 | 6 | 7955 | 16 |
| Sep. 16, 2009 | 9,190 | 96 | 10 | 7921 | 34 |
| Sep. 17, 2009 | 9,195 | 84 | 9 | 7900 | 21 |
| Sep. 18, 2009 | 9,186 | 29 | 3 | 7880 | 20 |
| Sep. 19, 2009 | 9,151 | 46 | 5 | 7856 | 24 |
| Sep. 20, 2009 | 9,154 | 71 | 8 | 7828 | 28 |
| Average | 9,075 | | | | 20 |

TABLE VI

| Date | Gas (Mscf) | Water (Bbls.) | Yield (BW/Mmscf) | FWHP (psig) | Daily Drawdown |
|---|---|---|---|---|---|
| Nov. 1, 2009 | 2,587 | 1,743 | 674 | 7579 | |
| Nov. 2, 2009 | 11,616 | 1,779 | 153 | 7995 | |
| Nov. 3, 2009 | 11,615 | 2,198 | 189 | 8128 | |
| Nov. 4, 2009 | 14,603 | 2,054 | 141 | 8287 | |
| Nov. 5, 2009 | 16,525 | 1,807 | 109 | 8306 | |
| Nov. 6, 2009 | 17,754 | 1,411 | 79 | 8306 | |
| Nov. 7, 2009 | 17,971 | 1,092 | 61 | 8304 | |
| Nov. 8, 2009 | 19,240 | 984 | 51 | 8231 | |
| Nov. 9, 2009 | 19,533 | 821 | 42 | 8191 | |
| Nov. 10, 2009 | 19,592 | 829 | 42 | 8116 | |
| Nov. 11, 2009 | 19,619 | 782 | 40 | 8034 | |
| Nov. 12, 2009 | 17,423 | 721 | 41 | 8714 | |
| Nov. 13, 2009 | 5,275 | 176 | 33 | 8418 | |
| Nov. 14, 2009 | 16,108 | 139 | 9 | 8389 | |
| Nov. 15, 2009 | 19,282 | 510 | 26 | 8076 | |
| Nov. 16, 2009 | 19,000 | 601 | 32 | 7973 | 103 |
| Nov. 17, 2009 | 16,062 | 357 | 22 | 7988 | −15 |
| Nov. 18, 2009 | 17,911 | 419 | 23 | 7882 | 106 |
| Nov. 19, 2009 | 18,069 | 561 | 31 | 7788 | 94 |
| Nov. 20, 2009 | 18,273 | 504 | 28 | 7685 | 103 |
| Nov. 21, 2009 | 18,163 | 573 | 32 | 7597 | 88 |
| Nov. 22, 2009 | 18,007 | 441 | 24 | 7533 | 64 |
| Nov. 23, 2009 | 17,845 | 516 | 29 | 7455 | 78 |
| Nov. 24, 2009 | 17,672 | 519 | 29 | 7381 | 74 |
| Nov. 25, 2009 | 17,502 | 621 | 35 | 7291 | 90 |
| Nov. 26, 2009 | 17,358 | 376 | 22 | 7239 | 52 |
| Nov. 27, 2009 | 17,233 | 566 | 33 | 7162 | 77 |
| Nov. 28, 2009 | 17,070 | 457 | 27 | 7095 | 67 |
| Nov. 29, 2009 | 16,936 | 407 | 24 | 7036 | 59 |
| Nov. 30, 2009 | 16,804 | 385 | 23 | 6945 | 91 |
| Dec. 1, 2009 | 16,620 | 300 | 18 | 6936 | 9 |

TABLE VI-continued

| Date | Gas (Mscf) | Water (Bbls.) | Yield (BW/ Mmscf) | FWHP (psig) | Daily Drawdown |
|---|---|---|---|---|---|
| Dec. 2, 2009 | 10,784 | 215 | 20 | 7144 | −208 |
| Dec. 3, 2009 | 11,022 | 50 | 5 | 7250 | −106 |
| Dec. 4, 2009 | 15,625 | 457 | 29 | 7007 | 243 |
| Dec. 5, 2009 | 16,699 | 415 | 25 | 6850 | 157 |
| Dec. 6, 2009 | 16,498 | 466 | 28 | 6750 | 100 |
| Dec. 7, 2009 | 16,265 | 523 | 32 | 6651 | 99 |
| Dec. 8, 2009 | 16,092 | 397 | 25 | 6582 | 69 |
| Dec. 9, 2009 | 15,914 | 394 | 25 | 6516 | 66 |
| Dec. 10, 2009 | 15,735 | 550 | 35 | 6428 | 88 |
| Dec. 11, 2009 | 15,561 | 345 | 22 | 6377 | 51 |
| Dec. 12, 2009 | 15,408 | 332 | 22 | 6307 | 70 |
| Dec. 13, 2009 | 15,257 | 417 | 27 | 6247 | 60 |
| Dec. 14, 2009 | 15,113 | 411 | 27 | 6182 | 65 |
| Average | 16,526 | | | | 65 |

The same generalities of Example 1 apply to this Example 5. The well for Table V and the well for Table VI were less than one mile apart and had about the same GPI. The well for Table V operated on a 16/64ths choke, and the well for Table VI operated on a 24/64ths choke. The choke size differences between these two wells were observed from the difference in average rate, average daily drawdown, and cumulative production. The determined PI values were the same although the wells were operated differently, which illustrated that the reservoir rock properties around each well were similar, as was expected considering their proximity. However, these two wells had different estimated ultimate recoveries (EURs), which meant that the PI was a more accurate measure of rock quality and was better suited for development decisions.

Additionally, the average daily drawdown calculated for each of the two wells used data for all days within the thirty day time period. The observed abnormal drawdowns were caused by temporary choke size changes and were therefore inconsequential to the analysis. Such attention to unique operating conditions was helpful in the analysis. The thirty day time period for the well of Table V was Aug. 22, 2009 to Sep. 20, 2009. From Aug. 12, 2009 to Aug. 21, 2009, it was seen that although the yield may be somewhat stabilized, the flowing wellhead pressure had not established a stable decline until Aug. 22, 2009, which was the first day of the thirty day time period. The thirty day time period for the well of Table VI was Nov. 15, 2009 to Dec. 14, 2009.

Although the present invention and its advantages have been described in detail, it should be understood that various changes, substitutions and alterations may be made herein without departing from the spirit and scope of the invention as defined by the appended claims.

What is claimed is:

1. A performance index method for determining a performance index for subterranean rock of an area, wherein the area comprises a well, the method comprising:
calculating the performance index from data of a time period from an equation:

$$PI=(q/dd)*(cum./GPI),$$

wherein PI is the performance index, q is an average daily rate of the well for the time period, dd is an average drawdown per day of the well for the time period, cum. is a cumulative production of the well for the time period, and GPI is a gross perforated interval of the well for the time period, wherein the GPI is a lateral length of the well from a first perforation to a last perforation;

determining the time period in which to measure the q, dd, and cum. during producing the well;
grouping the well into well clusters based at least in part on the calculated performance index, wherein the well clusters are groups of wells belonging to a particular range of PI values; and
mapping the well clusters to provide visual differentiation of rock quality for the area; and
at least one of installing and removing wells to maximize productivity of the subterranean rock formation based at least in part on the performance index.

2. The performance index method of claim 1, wherein the well is a natural gas well.

3. The performance index method of claim 1, wherein the well is fracture stimulated for production.

4. The performance index method of claim 1, wherein the time period begins on a beginning day, wherein the beginning day comprises a day that the well has a highest flowing wellhead pressure after the first day that a stable water yield occurs.

5. The performance index method of claim 4, wherein the time period ends on an ending day, wherein the ending day comprises a day from about a minimum day to about a maximum day.

6. The performance index method of claim 5, wherein the minimum day comprises a day in which a minimum amount of daily drawdown to define a flow capacity of the well is available.

7. The performance index method of claim 5, wherein the maximum day comprises a last day for evaluating production of a well to define a flow capacity of the well.

8. The performance index method of claim 4, wherein the time period comprises from the beginning day to about thirty days from the beginning day.

9. The performance index method of claim 4, wherein the time period comprises from about thirty days to about forty days from the beginning day.

10. The performance index method of claim 4, wherein the time period comprises about thirty days, wherein the about thirty days begins on the beginning day.

11. The performance index method of claim 1, further comprising selecting the time period based on a choke size.

12. The performance index method of claim 11, wherein determining the time period based on a choke size further comprises selecting the time period from about twenty days to about thirty days from a beginning day when the choke size is 18/64ths of an inch and larger.

13. The performance index method of claim 11, wherein determining the time period based on a choke size further comprises selecting the time period from about thirty days to about forty days from a beginning day when the choke size is smaller than 18/64ths of an inch.

14. The performance index method of claim 1, further comprising optimizing the time period.

15. The performance index method of claim 14, wherein optimizing the time period comprises removing days from the time period that exhibit abnormal well behavior in relation to other days in the time period.

16. The performance index method of claim 14, wherein optimizing the time period comprises removing a day from the time period when the day comprises a well shut down.

17. The performance index method of claim 14, wherein optimizing the time period comprises removing a day from the time period when the day comprises the well opening back up after a shut down.

18. The performance index method of claim 1, wherein the area comprises more than one well.

19. The performance index method of claim 1, wherein the gross perforated interval comprises a lateral length of the well.

20. The performance index method of claim 19, wherein the lateral length comprises a treated lateral length.

* * * * *